US012782205B2

(12) United States Patent
Linseis et al.

(10) Patent No.: US 12,782,205 B2
(45) Date of Patent: Nov. 3, 2026

(54) SENSOR, SENSOR SYSTEM AND METHOD FOR DETECTING THERMODYNAMIC PARAMETERS OF A SAMPLE, AND USE OF THE SENSOR OR SENSOR SYSTEM

(71) Applicant: Linseis Messgeräte GmbH, Selb (DE)

(72) Inventors: Florian Linseis, Selb (DE); Vincent Linseis, Selb (DE); Friedemann Völklein, Niedernhausen (DE)

(73) Assignee: Linseis Messgeräte GmbH, Selb (DE)

( * ) Notice: Subject to any disclaimer, the term of this patent is extended or adjusted under 35 U.S.C. 154(b) by 407 days.

(21) Appl. No.: 18/570,757

(22) PCT Filed: Jun. 16, 2022

(86) PCT No.: PCT/EP2022/066454
§ 371 (c)(1),
(2) Date: Dec. 15, 2023

(87) PCT Pub. No.: WO2022/263587
PCT Pub. Date: Dec. 22, 2022

(65) Prior Publication Data

US 2024/0280415 A1 Aug. 22, 2024

(30) Foreign Application Priority Data

Jun. 18, 2021 (DE) ..................... 10 2021 206 291.1
Nov. 19, 2021 (DE) ..................... 10 2021 213 046.1

(51) Int. Cl.
*G01K 7/02* (2021.01)
*G01K 17/00* (2006.01)
*G01K 19/00* (2006.01)

(52) U.S. Cl.
CPC ............... *G01K 7/02* (2013.01); *G01K 17/00* (2013.01); *G01K 19/00* (2013.01)

(58) Field of Classification Search
CPC ........... G01K 7/02; G01K 17/00; G01K 19/00
(Continued)

(56) References Cited

U.S. PATENT DOCUMENTS 6,079,873 A * 6/2000 Cavicchi ............ G01N 25/4866 422/51
6,238,085 B1 * 5/2001 Higashi .................. G01N 25/18 438/54

(Continued)

FOREIGN PATENT DOCUMENTS

CN 108027267 A * 5/2018 ............. G01F 1/692
DE 102019206214 A1 11/2020

OTHER PUBLICATIONS

European Patent Office, International Search Report and Written Opinion in Application No. PCT/EP2022/066454, dated Sep. 28, 2022, 11 pages, Rijswijk, Netherlands.

*Primary Examiner* — Mirellys Jagan
(74) *Attorney, Agent, or Firm* — Marshall & Melhorn, LLC

(57) ABSTRACT

The sensor may have a support structure having at least one substrate and at least one self-supporting membrane. At least one heating element has at least one electrical conducting track arranged on a first surface of the membrane. At least one thermopile, and the electrical conducting track of the heating element and/or the at least one heating element at least partly encloses the membrane on the first surface. An electronic evaluation and control unit is configured for detecting, on the basis of a calibration carried out by the heating element and a sample arranged at or on the membrane, at least one temperature gradient that has formed in the membrane owing to a thermodynamic process taking place in the sample and an associated release of heat or absorption of heat.

18 Claims, 4 Drawing Sheets

(58) Field of Classification Search
USPC .................................................... 374/208, 12
See application file for complete search history.

(56) References Cited

U.S. PATENT DOCUMENTS

| | | | | |
|---|---|---|---|---|
| 2014/0036953 | A1* | 2/2014 | Kimura ..................... | G01J 5/02 438/54 |
| 2015/0268182 | A1* | 9/2015 | Wettstein ........... | G01N 25/4833 29/832 |

* cited by examiner

SENSOR, SENSOR SYSTEM AND METHOD FOR DETECTING THERMODYNAMIC PARAMETERS OF A SAMPLE, AND USE OF THE SENSOR OR SENSOR SYSTEM

FIELD

The invention relates to a sensor, to a sensor system and to a method for detecting thermodynamic parameters of a sample, and to the use of the sensor or sensor system.

BACKGROUND

A key problem when determining thermodynamic parameters, in particular of small samples, arises as a result of the only minor release of heat or absorption of heat in such a sample by comparison with the thermal noise caused by the measurement apparatus. Therefore, when measuring extremely small amounts of heat, stringent requirements are needed in terms of thermally insulating a sample. In addition, interference during a measurement, which may be caused, for example, by thermodynamic processes that may take place in the immediate vicinity of the sample, or by an uncontrolled influence of the measurement apparatus on the sample itself, may lead to the measurement results being impaired.

Highly sensitive thermal sensors, for example nanocalorimeters, therefore have a complex construction and are conceived only for special applications. In addition, nanocalorimeters typically can operate efficiently only in a narrow spectral range, and therefore they require a complex calibration in this regard.

This object is achieved by a sensor, a sensor system, a method and the use of the sensor or sensor system according to the claims described herein. The dependent claims describe ad-vantageous embodiments.

SUMMARY

This object is achieved by a sensor according to claim 1, a sensor system according to claim 11, a method according to claim 15 and the use of the sensor or sensor system according to claim 18. The dependent claims describe advantageous embodiments.

The invention relates to a sensor for detecting thermodynamic parameters of a sample. The sensor comprises a support structure, at least one heating element, at least one thermopile and at least one electronic evaluation and control unit.

The support structure comprises at least one substrate and at least one selfsupporting membrane. The outer edge regions of the at least one self-supporting membrane are arranged on the at least one substrate.

The at least one heating element is formed having at least one electrical conducting track, which is arranged on a first portion of the first surface of the self-supporting membrane.

The at least one thermopile is formed having a plurality of thermocouples that are electrically interconnected in series, and at least partly encloses the at least one electrical conducting track and/or the at least one heating element on the first surface of the self-supporting membrane.

The at least one electronic evaluation and control unit is electrically connected to the thermopile and is configured for detecting, on the basis of a calibration carried out by means of the at least one heating element and a sample arranged at or on the self-supporting membrane, at least one temperature gradient that has formed in the self-supporting membrane owing to a thermodynamic process taking place in the sample and an associated release of heat or absorption of heat.

By arranging the at least one heating element, the at least one thermopile and/or the sample at least in part at/on a self-supporting membrane, sensitive components of the measurement apparatus and the sample are thermally insulated in a particularly efficient manner. In this case, the thermal conductivity of the self-supporting membrane is preferably less than the thermal conductivity of the substrate. Particularly preferably, the substrate forms, together with the self-supporting membrane, a support structure in the form of a nanobridge or microbridge.

The proposed sensor additionally allows the at least one thermopile to be calibrated in a particularly simple and accurate manner by means of the at least one heating element. For this purpose, while the sample is not present, a calibration curve, which can indicate a functional relationship between the heat output of the at least one heating element and an electrical voltage applied at the ends of the at least one thermopile, can be detected, for example by means of the at least one electronic evaluation and control unit. For this purpose, the at least one electrical conducting track of the at least one heating element can also be formed or arranged in a meandering shape in the first portion of the first surface of the self-supporting membrane.

Preferably, the electronic evaluation and control unit and the at least one thermopile are configured for detecting at least one temperature gradient that forms a vector orthogonal to the normal of the first surface of the self-supporting membrane. The components of the at least one temperature gradient that run in parallel with the normal of the first surface can be disregarded owing to the low thickness of the membrane of at most 1 μm.

During the detection of the at least one temperature gradient by means of the electronic evaluation and control unit, the sample can advantageously be arranged at or on a second surface, opposite the first portion of the first surface, of the self-supporting membrane. For example, the second surface can comprise a second portion which may be arranged so as to correspond to the first portion of the first surface. Particularly preferably, the sample is arranged at or on said second portion of the second surface of the self-supporting membrane. Particularly preferably, the sample is arranged on the second surface, pointing away from the at least one electrical conducting track of the at least one heating element, of the self-supporting membrane and so as to be directly opposite the at least one electrical conducting track.

Preferably, a heat-conducting layer is arranged on the at least one electrical conducting track of the at least one heating element or on a layer in which the at least one electrical conducting track and/or the at least one heating element is/are integrated. Particularly preferably, the surface, facing the at least one electrical conducting track and/or the at least one heating element, of the heat-conducting layer is arranged so as to correspond to the first portion of the first surface. In particular, the outer edge of the heat-conducting layer can run in parallel with the outer edge of the first portion of the first surface of the self-supporting membrane.

A reservoir can be formed around the region in which the particular sample is arranged, using which reservoir a liquid sample can be held in shape and kept in a sensitive region, and also a sufficiently large volume of sample can be kept available.

By way of example, a layer in which the at least one electrical conducting track and/or the at least one heating element is/are integrated can be formed having an electrical passivation or insulation, which may be arranged between the at least one heating element and the heat-conducting layer. The electrical passivation can, for example, be formed of silicon dioxide.

Preferably, the heat-conducting layer has a thermal conductivity of at least 200 W/(m K). By way of example, the heat-conducting layer can be formed of or made of gold. Advantageously, owing to the heat-conducting layer, a particularly homogeneous temperature distribution can be ensured in the first portion of the first surface of the self-supporting membrane. In addition, heat emission losses or undesirable heat radiation losses can be reduced in and around said region, thereby further increasing the sensitivity of the sensor.

Preferably, starting from the outer edge of the self-supporting membrane, the electrical conductors of the thermocouples are led on the first surface of the self-supporting membrane as far as the outer edge of the first portion of the first surface of the self-supporting membrane.

A plurality of first connection points and a plurality of second connection points of the thermocouples can be formed in alternation along the thermopile. The first connection points and the second connection points can each electrically interconnect two electrical conductors formed of different materials. Preferably, the first connection points are arranged on the outer edge of the first portion of the first surface. The second connection points can be arranged at a distance from the outer edge of the first portion of the first surface. Particularly preferably, the second connection points are arranged on the substrate of the support structure or on the outer edge regions of the selfsupporting membrane.

Preferably, the thermopile at least partly encompasses the at least one electrical conducting track, the at least one heating element or the first portion of the first surface in a meandering manner. For this purpose, the thermopile can be formed having at least ten thermocouples that are interconnected in series, preferably having at least twenty thermocouples that are interconnected in series, particularly preferably having at least forty or even more thermocouples that are interconnected in series.

Thus, a temperature difference detected by means of the at least one thermopile, for example the magnitude of the at least one temperature gradient, can correspond to the temperature difference between a temperature of the self-supporting membrane at or on the first portion of the first surface of the self-supporting membrane and a temperature of the substrate or a temperature of the self-supporting membrane at or on the edge regions of the first surface of the self-supporting membrane.

Preferably, the at least one heating element comprises at least two electrical contact elements, which can be electrically connected to the outer ends of the electrical conducting track of the at least one heating element. The at least two electrical contact elements of the at least one heating element can be arranged on the substrate or on an outer edge region of the self-supporting membrane.

Additionally or alternatively, the at least one thermopile may also comprise at least two further electrical contact elements, which may each be electrically connected to an outer end of the at least one thermopile. The at least two further electrical contact elements can be arranged on the substrate or on an outer edge region of the self-supporting membrane.

For calibration purposes, for example, the at least one electronic evaluation and control unit can be electrically connected to the at least one heating element by means of the at least two electrical contact elements of the at least one heating element and/or to the at least one thermopile by means of the at least two further electrical contact elements of the at least one thermopile.

Preferably, the sensor comprises a housing in order to obtain the highest possible signal stability and further reduce the thermal noise. The support structure, the at least one heating element and the at least one thermopile can be arranged in the housing together with the sample. Particularly advantageously, the housing is arranged in a thermostatic chamber, it being possible to keep the immediate surroundings and the housing itself at a constant, predetermined temperature by means of the thermostatic chamber. In this case, the housing can advantageously be formed of an electrically insulating and thermally conductive material, for example copper.

In addition, the housing can comprise highly thermally conductive supporting or retaining structures, which may likewise be formed of copper, for example. The supporting or retaining structures can be arranged in the interior of the housing and be configured for receiving, supporting or retaining the support structure having the self-supporting membrane, the at least one heating element and the at least one thermopile in such a way that the self-supporting membrane can be arranged at a distance from an outer edge of the frame of the housing or an inner surface of the outer frame of the housing. For this purpose, the supporting or retaining structures can, for example, be configured in the form of supporting pillars or retaining ridges and each be connected to the outer frame of the housing at one end and to the support structure at another end. The housing can also be hermetically sealed from the surroundings, which should be the case at least during each measurement. As a result, the determination can be carried out while maintaining vacuum conditions at least in the vicinity of the vacuum, in order to be able to operate a sensor in an encapsulated manner in a vacuum. In the process, the entire sensor can be brought under a vacuum. Only the “sample side” of the sensor may be supplied with microfluidics in order to be able to deposit a particular sample onto the membrane of a sensor. By operating the sensor in a vacuum, a high degree of sensitivity (around a factor of 6) can again be obtained since the thermal losses and the thermal noise can be drastically reduced. In this case, vacuum conditions can prevail on both sides of the membrane. Merely the region of the sample bearing surface can be outside said conditions. An encapsulated microfluidics system can thus be present.

The atmosphere above the sensitive region on which a sample can be arranged can be varied in a defined manner. If a sensor were to be operated in the open air, the enthalpy of vaporization of the aqueous solution in which a sample may be contained would eclipse the actual measurement signal many times over. Therefore, the atmosphere in the actual measurement chamber around the particular sample should be controlled. In the simplest case, the sample volume can be hermetically sealed and the user can wait until a balanced vapour pressure has been established. Vaporization of the liquid can thus be stopped.

The atmospheric conditions, and in particular the pressure especially in the region in which the particular sample is arranged, can also be set in a defined manner. Furthermore, the atmospheric pressure also prevailing in the area surrounding the sensor and the housing can be maintained on both sides of the membrane.

Preferably, only the outer edge regions of the self-supporting membrane or the substrate of the support structure are connected to the supporting or retaining structures. Particularly preferably, the support structure is connected to the housing or the outer frame of the housing by means of the supporting or retaining structures. To ensure the best possible thermal contact between the housing and the supporting or retaining structures, the support structure can be connected to the supporting or retaining structures by means of a thermal paste, which can be arranged between the support structure and the supporting or retaining structures.

The housing can also comprise electrical contacts, which are led from the support structure through the outer frame of the housing into a region located outside the housing. In this case, the electrical contacts can each electrically connect the electrical contact elements of the at least one heating element and/or of the at least one thermopile to the at least one electronic evaluation and control unit.

In this case, the sample can be arranged at or on the second surface, facing away from the supporting and retaining structures, of the self-supporting membrane. Here, the sensitivity of the sensor may also be dependent on the distance between the sample or the self-supporting membrane and the inner surface of the housing or the outer frame of the housing. It thus may prove advantageous if a distance between the inner surface of the housing or the outer frame of the housing and the self-supporting membrane or the sample is at least 2.5 mm, preferably at least 5 mm.

In this case, the first surface of the self-supporting membrane can measure at least 20 $mm^2$, preferably at least 30 $mm^2$. The first portion of the first surface can measure at least 10 $mm^2$, preferably at least 15 $mm^2$. Preferably, the thickness of the self-supporting membrane is at most 1000 μm, preferably less than 500 nm, particularly preferably less than 350 nm. By selecting a large first surface of the membrane while simultaneously having a low thickness of the membrane, the signal-to-noise ratio, and thus also the measurement accuracy of the sensor, can be improved in particular. The reservoir for holding the sample (active surface) currently measures around 1 mm×1 mm×0.3 mm or, in the large version, 5 mm×5 mm×0.3 mm. The active region should be selected in the range between 0.1 mm×0.1 mm×0.3 mm and 5 mm×5 mm×0.3 mm. The thickness can be selected in the range between 0.3 mm and 0.8 mm.

The thermal, chemical and mechanical properties of the sensor can advantageously be influenced by a suitable material selection or material combination and a geometry of the various components. By way of example, the substrate can be formed of silicon. The self-supporting membrane can be formed of a material that has a lower thermal conductivity compared with the substrate and/or the heat-conducting layer. For example, the self-supporting membrane can be formed of silicon nitride. Additionally or alternatively, the substrate can comprise a further layer, which may form an outer surface of the substrate, on a side or surface facing away from the self-supporting membrane. The further layer can also be formed of a material that is thermally and/or electrically insulating in relation to the substrate, for example of silicon nitride.

It is also advantageous if the materials of the thermocouple legs of a thermocouple each have different Seebeck coefficients while good compatibility or adhesion of the two thermocouple legs with at least one material of the self-supporting membrane is ensured at the same time. For example, at least a first thermocouple leg of a thermocouple of the at least one thermopile, preferably a p-type thermocouple leg, can be formed of or made of antimony. At least a second thermocouple leg of a thermocouple of the at least one thermopile, preferably an n-type thermocouple leg, can be formed of or made of bismuth.

The invention also relates to a sensor system.

In this regard, a biosensor can be arranged in a surface region on which the sample is arranged. The biosensor can be formed by at least two electrodes which are arranged at a distance from one another and are connected to an electrical voltage source having a preferably constant electrical voltage and to the at least one electronic evaluation and control unit. The electrodes are connected to the at least one electronic evaluation and control unit. The electrical current flow between the at least two electrodes is measured by the electronic evaluation and control unit, and a measured variable that is characteristic of the metabolism of the sample is detected and evaluated by the at least one electronic evaluation and control unit. The measured variable may preferably be the pH, which may be characteristic of changes in the metabolism of biological samples.

Just like electrical conducting tracks, which are led to the electronic evaluation and control unit, the electrodes can also be formed by means of thin-film or thick-film technologies on the surface of the membrane.

In this case, the electrodes should be arranged directly at the particular sample. Preferably, they can be made of titanium, but also of platinum, gold or another suitable metal.

The electrodes are electrically isolated from the substrate, which typically can be formed of silicon. This can be achieved, for example, by means of a dielectric passivation layer or by a local modification to the silicon to render it practically non-conductive.

The electrodes can be applied by means of thin-film or thick-film technologies.

In isolation or in addition to the above, the sensor system can also be formed having at least one measurement instrument connected to or arranged in the housing. The proportion of oxygen and/or carbon dioxide contained in the atmosphere inside the housing can then be determined using the measurement instrument. Instead of a measurement instrument, at least one suitable sensor can also be arranged in the housing. In this case, the housing should be sealed, or be able to be sealed, from the surrounding atmosphere in a gas-tight manner. Depending on the metabolism taking place at that moment in a biological sample, the proportion of oxygen is reduced and simultaneously the proportion of carbon dioxide is increased, or vice versa, and therefore conclusions can also be drawn on the current state of the particular sample.

The sensor system can also be formed having at least two sensors as described above, the at least two sensors being arranged in a shared housing. In this case, a first of the at least two sensors can be used for detecting thermo-dynamic parameters of a sample being investigated, and the second of the at least two sensors can be used as a reference sensor.

Preferably, the reference sensor can also be used for determining and/or compensating for undesirable temperature gradients which may form even when no sample is present due, for example, to uncontrollable heat sources or production-induced asymmetries in the first sensor. For this purpose, the at least two sensors can also comprise a shared support structure and/or a shared substrate. The support structures and/or the substrates of each sensor of the sensor system can also be integrally bonded together or frictionally interconnected, so as to enable, at least temporarily, the exchange of heat or the compensation for undesirable temperature gradients, for example by means of the at least one heating element of the reference sensor. For this purpose, the sensor system can also comprise a plurality of second sensors formed as reference sensors, in addition to the first sensor. Preferably, the sensor system is formed having at least four sensors as described above, it being possible to arrange the at least four sensors being able in one housing.

Advantageously, two sensors can be arranged directly next to one another on a wafer as a substrate, leading to a virtually integrated dual sensor. In the process, the thermocouples of the two sensors can be directly interconnected. For this purpose, the electrical conducting tracks on the sensors that form the thermopiles can already be directly interconnected in an electrically conductive manner. Alternatively, however, this can also be electronically achieved outside the sensors using a correspondingly configured electronic evaluation unit connected to the two sensors.

In the case of a differential evaluation, the flow of heat between the two reservoirs of the two sensors can be measured. In this way, the temperature difference between the two measurement positions on the two sensors can be measured.

The invention also relates to a method for detecting thermodynamic parameters of a sample using the sensor or sensor system described above.

In the method, in a first step, a calibration is carried out by means of the at least one heating element, in which calibration the electrical voltage applied at the ends of the at least one thermopile is detected as a function of the heat output of the at least one heating element.

In a second step, on the basis of the calibration carried out in the first step, at least one temperature gradient that has formed in the self-supporting membrane owing to a thermodynamic process taking place in the sample and an associated release of heat or absorption of heat is detected.

In the process, the sample can be arranged in the housing and/or at or on the first surface of the self-supporting [membrane] chronologically before the second step and/or before the first step. During the second step, the heat output of the at least one heating element can be kept constant and/or reduced to zero, such that the sample cannot be heated by means of the at least one heating element during the second step. In particular, the at least one heating element can be specially configured for calibrating the sensor or the at least one thermopile.

Preferably, the temperature of the substrate of the support structure and/or of the outer edge regions of the self-supporting membrane is kept constant during the first step and/or during the second step. This can be achieved, for example, by arranging the housing together with the support structure, the at least one thermopile and the at least one heating element in a thermostatic chamber and by ensuring good conduction of heat between the housing, the supporting or retaining structures and the substrate of the support structure or the outer edge regions of the self-supporting membrane. Alternatively or additionally, the housing itself can also be formed as a thermostatic chamber.

In particular, the temperature of the housing, of the substrate of the support structure and/or of the outer edge regions of the self-supporting membrane can be kept the same during the first step and/or during the second step. As a result, it is possible to achieve particularly accurate detection of a temperature gradient that forms from a central region of the self-supporting membrane, for example from the first portion of the first surface.

The sample can be arranged in an encapsulation at least while the second step is being carried out. The encapsulation can be formed by a membrane, liquid and/or one or more liquid droplets that at least partly enclose the sample. Preferably, the support structure is arranged at or on the supporting or retaining structures of the housing in such a way that the sample can rest on or be arranged on the second surface of the self-supporting membrane together with the encapsulation.

While the method is being carried out, a temperature gradient can be obtained by at least one pulse. In a pulse, the temperature in the region of the sample can be increased by a predeterminable temperature within a predetermined time period; preferably, the temperature can be increased in the range between 0.05 K and 5 K within 5 s. Next, the drop in the temperature in the region of the sample is detected in a time-resolved manner, and the accordingly detected temperature drop curve is compared, by means of the at least one electronic evaluation and control unit, with temperature drop curves that have been detected in a time-resolved manner beforehand on similar samples having a known metabolic functionality. In this way too, conclusions can be drawn on the current metabolic functionality of a biological sample. The pulse-like temperature increase together with the time-resolved detection of the temperature drop curves, as well as the comparison with predetected temperature drop curves can be repeated cyclically at preferably identical intervals but also non-identical intervals.

In this case, the heating is carried out periodically, the electrical current that can flow through the heating element at an electrical current in the range of 50 μA and 5 mA being in accordance with the function $I(t)=I_0 \cos(\omega t)$ at the frequency w. In this case, the voltage drop over the heating element is detected.

The temperature oscillation of the heating element can be calculated from the third harmonic components of the electrical voltage in accordance with the equation $\Delta T(t)=\Delta T_0 \cos(2\omega t+\phi)$, as can usually be done with the known 3-omega method.

Information on the state of the sample, for example ingrowth behaviour, growth, particular cell count, etc., can then be obtained from the characteristic temperature response.

The sensor according to the invention, the sensor system according to the invention and/or the method according to the invention can be used to detect and determine thermodynamic parameters of different samples, for example medical or biological samples. A thermodynamic parameter may, for example, be a temperature, a heat of condensation or a thermal capacity. In this case, chemical reactions taking place in the sample can be determined more fully by means of the sensor. Particularly advantageously, the sensor according to the invention, the sensor system according to the invention and/or the method according to the invention can be used to determine thermodynamic parameters of metabolic processes in biological cells and/or of condensation processes on surfaces or in thin films.

DESCRIPTION OF THE FIGURES

The invention will be explained in more detail below on the basis of embodiment examples.

In the drawings.

DETAILED DESCRIPTION

Figure 1A:
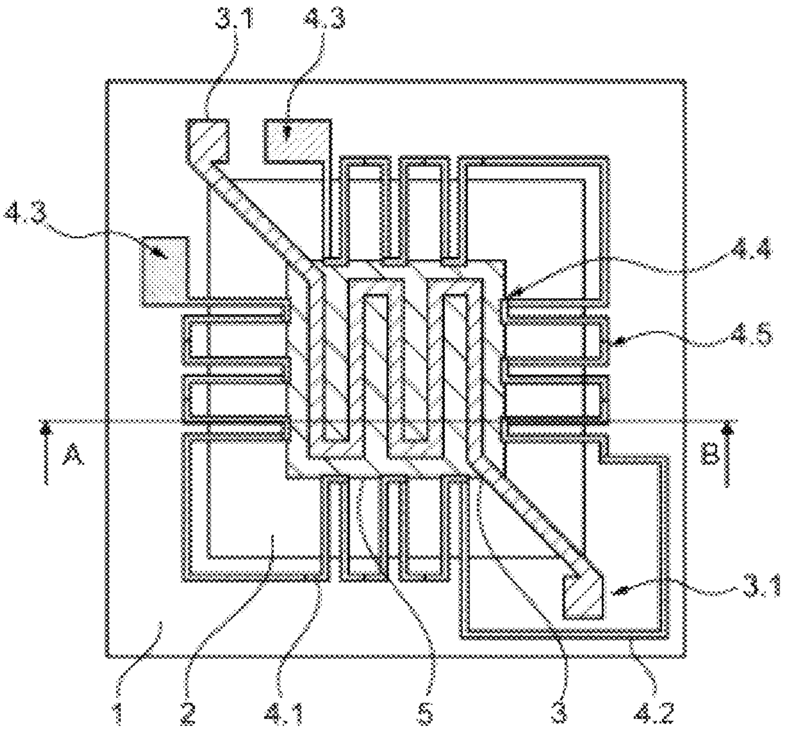
FIG. 1*a* is a schematic view of a front of an example sensor according to the invention.

FIG. 1*a* shows the example sensor for detecting thermodynamic parameters of biological cells as a sample 6.

The sensor comprises a support structure, which is formed having a substrate 1 and a self-supporting membrane 2. Additionally, the support structure can be formed having an outer layer 1.1. The substrate 1 is formed of silicon, the thickness of the substrate 1 being approximately 300 μm. The self-supporting membrane 2 is formed of silicon nitride and has a thickness of 300 μm. The self-supporting membrane is square, having a surface area of 36 $mm^2$. The substrate 1 has a cavity, which is closed on one side by the self-supporting membrane 2. In this case, the outer edge regions of the self-supporting membrane 2 are arranged on the substrate 1 such that the support structure forms a microbridge. For this purpose, the substrate 1 has a frame-like shape. This is where the new reservoir is now located, which takes on the function of the sample holder.

The sensor further comprises a heating element 3. The heating element 3 has at least one electrical conducting track, which is formed of antimony and arranged in a meandering manner on a central region as the first portion of the first surface of the self-supporting membrane 2. In addition, the heating element 3 has electrical contact elements 3.1, which are electrically connected to the electrical conducting track, the electrical contact elements 3.1 being arranged on the substrate 1. In this case, the electrical conducting track is arranged in a passivation layer formed of silicon dioxide.

A heat-conducting layer 5 formed of gold is arranged on the passivation layer in which the electrical conducting track of the heating element 3 is integrated. The surface, facing the heating element 3, of the heat-conducting layer 5 is arranged so as to correspond to the first portion of the first surface of the self-supporting membrane 2. In particular, the heat-conducting layer 5 has a thickness of 300 nm and a square surface area of 16 $mm^2$. Accordingly, the first portion of the first surface of the self-supporting membrane is square and is formed measuring 16 $mm^2$.

The sensor further comprises a thermopile. The thermopile is formed having a plurality of thermocouples, which are electrically interconnected in series and in turn each have two different thermocouple legs 4.1, 4.2, and encloses the electrical conducting track of the heating element 3 on the first surface of the self-supporting membrane 2 in a meandering manner. Further electrical contact elements 4.3 are arranged respectively on the two outer ends of the thermopile, which is formed having the thermocouple legs 4.1, 4.2, and are electrically connected to the thermocouples, which are in turn formed having thermocouple legs 4.1, 4.2.

The sensor also comprises an electronic evaluation and control unit (not shown), which is electrically connected to the thermopile and is configured for detecting, on the basis of a calibration carried out by means of the heating element 3 and on the basis of the biological cells as the sample 6, a temperature gradient that has formed in the self-supporting membrane 2 owing to thermodynamic processes taking place in the biological cells as the sample 6 and an associated release of heat.

For this purpose, starting from the outer edge of the self-supporting membrane 2, the electrical conductors of the thermocouple legs 4.1, 4.2 are led on the first surface of the self-supporting membrane 2 as far as the outer edge of the first portion of the first surface of the self-supporting membrane 2.

A plurality of first, cold connection points 4.4 and a plurality of second, hot connection points 4.5 are formed in alternation along the thermopile in the thermopile on the thermocouple legs 4.1, 4.2. The first, cold connection points 4.4 are arranged at the outer edge of the first portion of the first surface, which runs in parallel with the outer edge of the heat-conducting layer 5. The second, hot connection points 4.5 are arranged at a distance from the outer edge of the first portion of the first surface and arranged on the substrate 1 of the support structure.

By arranging the thermocouples oriented in this manner, temperature gradients that form vertically in relation to the normal of the first surface in the self-supporting membrane 2 in the direction of the outer edge regions of the self-supporting membrane 2 can be detected efficiently by way of the further contact elements 4.3 of the thermopile by means of the electronic evaluation and control unit.

In the example shown in FIG. 1*a*, the p-type thermocouple legs 4.1 of the thermocouples are made of antimony and the n-type thermocouple legs 4.2 of the thermocouples are made of bismuth. The thickness of the p-type thermocouple legs 4.1, the n-type thermocouple legs 4.2 and the further layer 1.1 is 200 nm.

Recurring features are provided with the same reference numerals as in FIG. 1*a* in the subsequent figures.

Figure 1B:
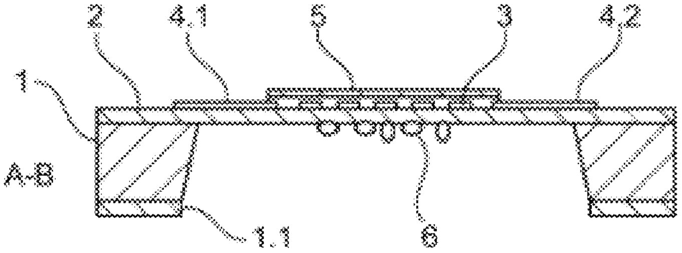
FIG. 1*b* is a sectional view of the example sensor according to the invention shown in FIG. 1.

FIG. 1*b* shows a schematic layered construction of the example sensor according to the invention shown in FIG. 1*a*. Specifically, FIG. 1*b* is a cross section along the section line A-B shown in FIG. 1*a*.

A further outer layer 1.1 of the support structure, which is formed of silicon nitride, is arranged on a surface of the substrate 1 pointing away from the self-supporting membrane 2. The biological cells as the sample 6 are arranged in a plurality of liquid droplets as an encapsulation on the second surface of the self-supporting membrane 2 pointing away from the heating element 3.

Figure 1C:
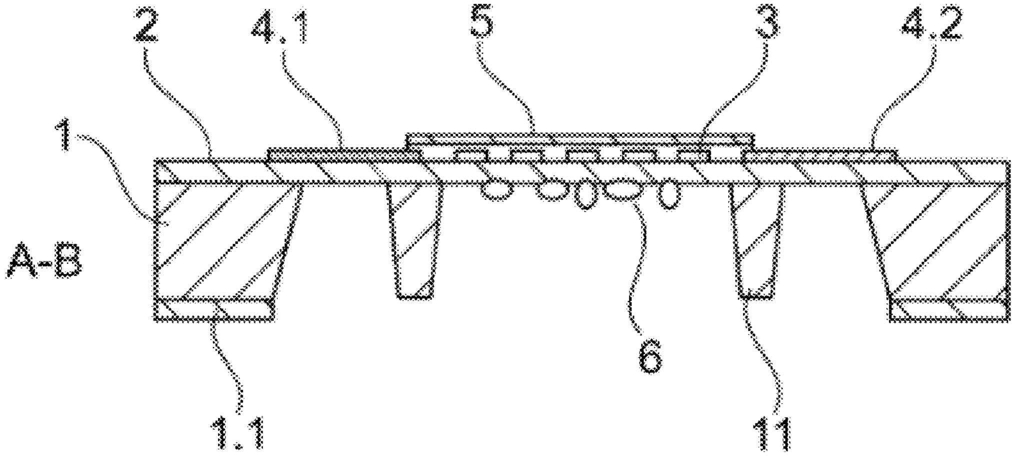
FIG. 1*c* is a sectional view of the example sensor according to the invention shown in FIG. 1 comprising an additional reservoir.

The configuration shown in FIG. 1*c* differs merely in that a reservoir 11 in the form of a chamber in which the sample 6 is received is arranged around the sample 6 on the side of the membrane 2 on which the particular biological sample 6 is also arranged.

Figure 2A:
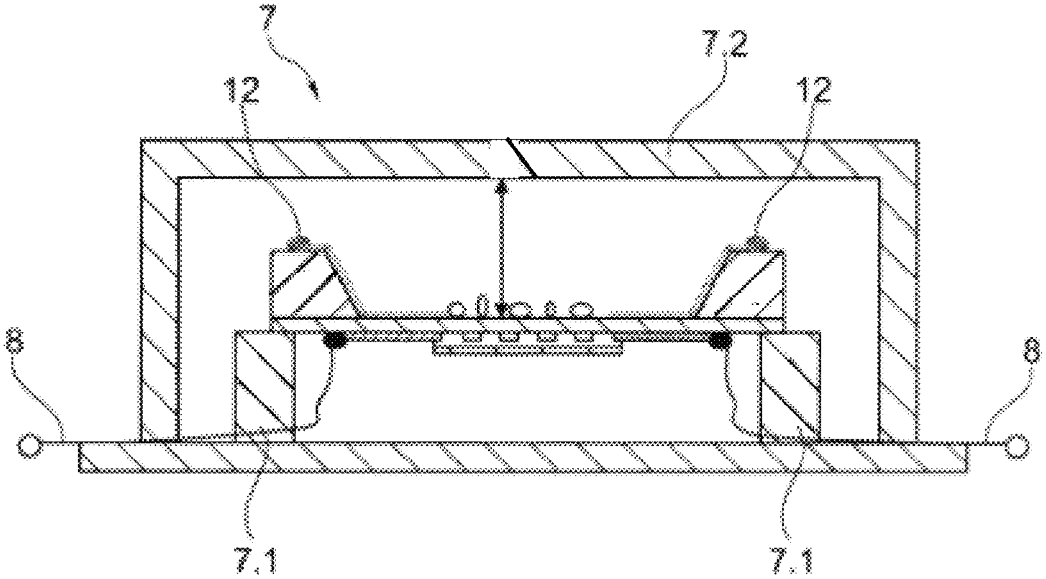
FIG. 2*a* shows an example sensor according to the invention comprising a housing.

FIG. 2*a* shows an example sensor according to the invention as shown in FIGS. 1*a* and 1*b*, the sensor additionally having a housing 7 formed of copper. The housing 7 is formed having a plurality of pillars as supporting structures 7.1 for receiving or securing the support structure, and having an outer frame 7.2. Both the supporting structures 7.1 and the outer frame 7.2 are formed of copper.

Figure 2B:
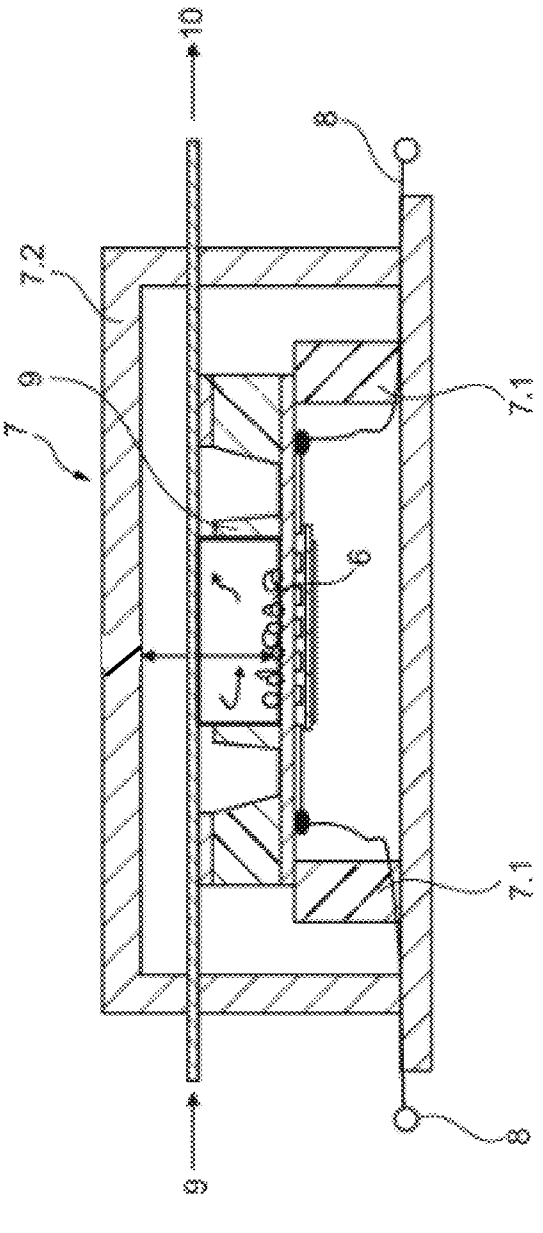
FIG. 2*b* shows an example sensor according to the invention comprising a housing in which vacuum conditions can be maintained.

The construction shown in FIG. 2*b* differs from that shown in FIG. 2*a* in that vacuum conditions can be maintained at least in the region arranged around the sample 6. For this purpose, a line having a supply 9 and a drain 10 is led through the housing 7, by which line a microfluid can be conducted into and through the housing 7.

The pillars as the supporting structures 7.1 are connected to the outer frame 7.2 on a first side facing away from the support structure, and are connected to the self-supporting membrane 2 in the region of the outer edge regions of the first surface on a side facing the support structure. In this case, the substrate 1 and the further outer layer 1.1 are arranged on a side of the self-supporting membrane 2 pointing away from the supporting structures 7.1.

Electrical contacts 8 are each guided from the electrical contact elements 3.1 of the heating element 3 and the further electrical contact elements 4.3 of the thermopile, through the outer frame 7.2 of the housing 7, into a region outside the housing 7, where they are electrically connected to the electronic evaluation and control unit. In this case, the transfer point is preferably on the solid copper block, so as to prevent any discharge of heat.

FIG. 2*a* also shows the electrodes 12 for the biosensor.

Figure 3:
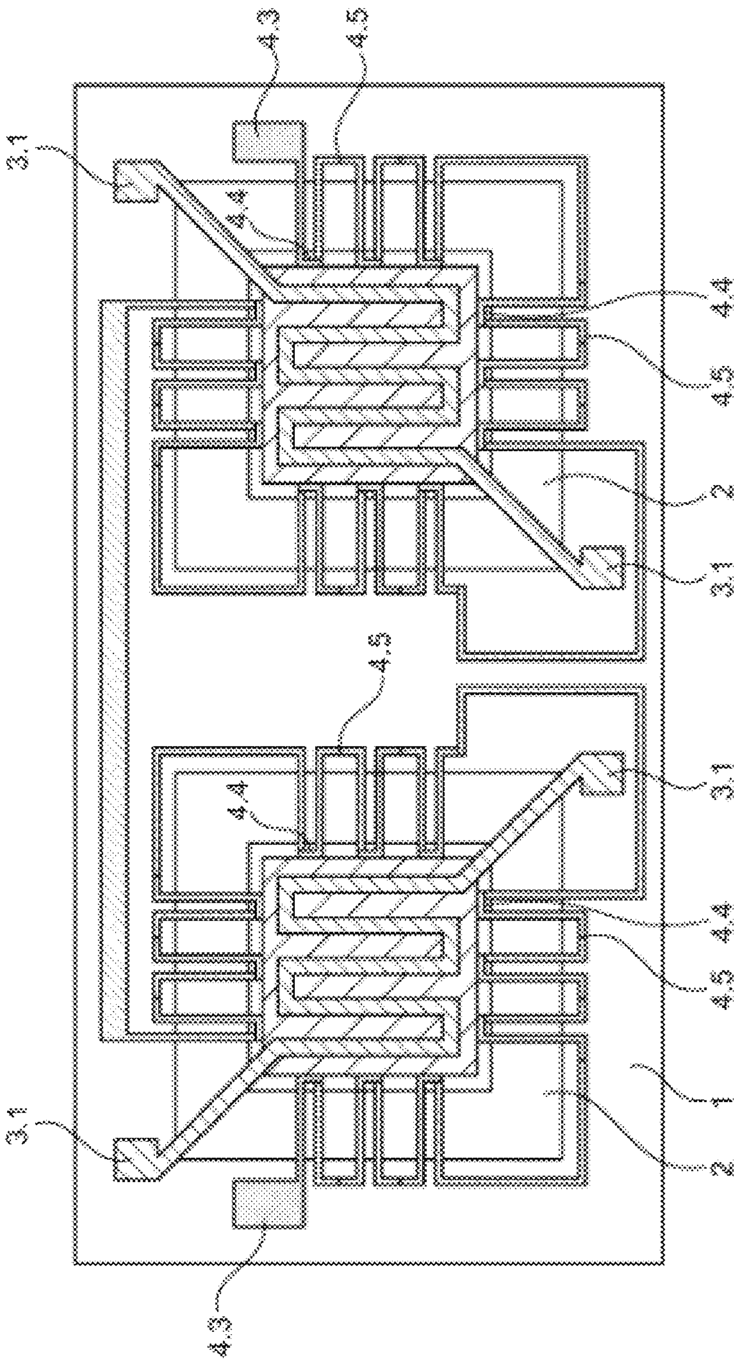
FIG. 3 shows two interconnected sensors for improved compensation of errors.

FIG. 3 shows how two sensors, which may be formed in accordance with the above-described examples and arranged jointly on one substrate 1, can be combined with one another. In this regard, at least two thermopiles, which are formed having thermocouple legs 4.1, 4.2 and an electrical contact element 4.3, of the two sensors are electrically wired in series, as a result of which the two sensors can be operated in the manner explained in the general part of the description.

A method for detecting thermodynamic parameters of the biological cells as the sample 6 using a sensor as shown in FIGS. 1*a*, 1*b* and 2 comprises at least a first and a second step.

In the first step, a calibration is carried out by means of the heating element 3, in which calibration the electrical voltage applied at the ends of the thermopile is detected as a function of the heat output of the heating element 3. In the process, the electronic evaluation and control unit is electrically connected to the heating element 3 and the thermopile by means of the electrical contacts 8, the electrical contact elements 3.1 and the further electrical contact elements 4.3. In particular, the electronic evaluation and control unit also comprises a controller, by which the heat output of the heating element 3 is varied during the first step. The biological cells as the sample 6 are not arranged in the housing 7 during the first step.

After the calibration, the biological cells as the sample 6 are arranged in the liquid droplets as the encapsulation on a second surface, opposite the first portion of the first surface, of the self-supporting membrane 2, in particular so as to be opposite the electrical conducting track of the heating element 3.

In the second step, on the basis of the calibration carried out in the first step, temperature gradients that have formed in the self-supporting membrane 2 owing to metabolic processes taking place in the biological cells as the sample 6 and an associated release of heat are detected. During the second step, no control is carried out, nor is the sample 6 heated by means of the heating element 3. The heat output of the heating element 3 is 0 W during the second step.

During the first and the second step, the housing 7 is arranged in a thermostatic chamber such that both the housing 7, having the outer frame 7.2 and the supporting structures 7.1, and the substrate 1 of the support structure are kept constantly at one and the same temperature $T_0$ during the first and the second step of the above-described method.

Using the above-described sensor and method, temperature gradients in the millikelvin range can be reliably and accurately determined while a thermal output of the sample is in the range from microwatts to a few nanowatts. In the process, the sensor can achieve a sensitivity of 100 V/W +25 V/W.

Features of the various embodiments disclosed solely in the embodiment examples can be combined with one another and claimed separately.

LIST OF REFERENCE NUMERALS

1 Substrate
1.1 Layer
2 Membrane
3 Heating element
3.1 Electrical contact element
4.1 Thermocouple leg
4.2 Thermocouple leg
4.3 Electrical contact element
4.4 First connection point (cold)
4.5 Second connection point (hot)
5 Heat-conducting layer
6 Sample
7 Housing
7.1 Thermally conductive supporting or retaining structure
7.2 Frame
8 Electrical contact
9 Supply
10 Drain
11 Reservoir
12 Electrodes

The invention claimed is:

1. A sensor for detecting thermodynamic parameters of a sample, comprising a support structure having at least one substrate and at least one self-supporting membrane, wherein edge regions of the at least one self-supporting membrane are arranged on the at least one substrate, at least one heating element, which is formed having at least one electrical conducting track arranged on a first portion of a first surface of the at least one self-supporting membrane, at least one thermopile, which is formed having a plurality of thermocouples that are electrically interconnected in series, and at least partly encloses the at least one electrical conducting track of the at least one heating element and/or the at least one heating element on the first surface of the at least one self-supporting membrane, and at least one electronic evaluation and control unit, which is electrically connected to the at least one thermopile and is configured for detecting, on the basis of a sample arranged at or on the at least one self-supporting membrane and a calibration carried out by using the at least one heating element, at least one temperature gradient that has formed in the at least one self-supporting membrane owing to a thermodynamic process taking place in the sample and an associated release of heat or absorption of heat by the sample.

2. The sensor according to claim 1, wherein during the detection of the at least one temperature gradient by means of the at least one electronic evaluation and control unit, the sample is arranged at or on a second surface, opposite to the first portion of the first surface, of the at least one self-supporting membrane or on a second surface, pointing away from the at least one electrical conducting track of the at least one heating element, of the at least one self-supporting membrane and so as to be directly opposite to the at least one electrical conducting track of the at least one heating element.

3. The sensor according to claim 1, wherein a reservoir is arranged around a region of the at least one self-supporting membrane at or on which the sample is arranged.

4. The sensor according to claim 1, wherein a heat-conducting layer is arranged on the at least one electrical conducting track of the at least one heating element or on a layer of the at least one self-supporting membrane in which the at least one electrical conducting track of the at least one heating element and/or the at least one heating element is/are integrated a surface of the heat-conducting layer that faces the at least one electrical conducting track of the at least one heating element and/or faces the at least one heating element being arranged so as to correspond to the first portion of the first surface of the at least one self-supporting membrane, and/or the heat-conducting layer is formed of gold.

5. The sensor according to claim 1, wherein starting from an outer edge of the at least one self-supporting membrane, electrical conductors of the thermocouples are led on the first surface of the at least one self-supporting membrane as far as an outer edge of the first portion of the first surface of the at least one self-supporting membrane.

6. The sensor according to claim 1, wherein a plurality of first connection points and a plurality of second connection points of the thermocouples are arranged in alternation along the at least one thermopile, the first connection points and the second connection points each electrically interconnecting two electrical conductors formed of different materials, and the first connection points being arranged at an outer edge of the first portion of the first surface and/or the second connection points being arranged at a distance from an outer edge of the first portion of the first surface and/or being arranged on the at least one substrate of the support structure.

7. The sensor according to claim 1, wherein the at least one heating element comprises at least two electrical contact elements, which are electrically connected to the outer ends of the at least one electrical conducting track of the at least one heating element and/or are arranged on the at least one substrate, and/or the at least one thermopile comprises at least two electrical contact elements, which are each electrically connected to an outer end of the thermopile and/or are arranged on the at least one substrate.

8. The sensor according to claim 1, wherein the support structure, the at least one heating element, and the at least one thermopile are arranged in a housing, the housing being formed of copper and/or the housing comprising thermally conductive supporting or retaining structures and/or or the housing being connected to the support structure by means of thermally conductive supporting or retaining structures and/or by means of a thermal paste, and/or electrical contacts are led from the support structure through an outer frame of the housing into a region located outside of the housing, and/or the housing is arranged in a thermostatic chamber.

9. The sensor according to claim 1, wherein the first surface of the at least one self-supporting membrane measures at least 10 $mm^2$ and/or the thickness of the at least one self-supporting membrane is at most 1 μm and/or a distance between a second surface, facing away from the at least one heating element, of the at least one self-supporting membrane and a housing and/or an outer frame of a housing is at least 5 mm.

10. The sensor according to claim 1, wherein the at least one substrate is formed of silicon and/or the at least one self-supporting membrane is formed of silicon nitride and/or p-type thermocouple legs of the thermocouples are formed of antimony and/or n-type thermocouple legs of the thermocouples are formed of bismuth.

11. The sensor system according claim 1, wherein at least one measurement instrument is connected to or arranged in a housing, and a proportion of oxygen and/or carbon dioxide contained in an atmosphere inside the housing can be determined using said measurement instrument.

12. The sensor system according to claim 1, wherein at least two sensors are arranged in a shared housing.

13. The sensor system according to claim 12, wherein thermopiles of the two sensors are electrically wired in series.

14. A method for detecting thermodynamic parameters of a sample using the sensor according claim 1, in which in a first step, a calibration is carried out by means of the at least one heating element, in which calibration an electrical voltage applied at ends of the at least one thermopile is detected as a function of the heat output of the at least one heating element, and in a second step, on the basis of the calibration carried out in the first step, at least one temperature gradient that has formed in the at least one self-supporting membrane owing to a thermodynamic process taking place in the sample and an associated release of heat or absorption of heat by the sample is detected.

15. The method according to claim 14, wherein a temperature of the at least one substrate is kept constant during the first and/or the second step.

16. The method according to claim 14, wherein the sample comprises biological cells, and the method further comprises:

determining, by the at least one electronic evaluation and control unit and based on the detected at least one temperature gradient, thermodynamic parameters of metabolic processes in the biological cells.

17. The method according to claim 14, wherein the sample is arranged in a housing and/or at or on the first surface of the at least one self-supporting membrane chronologically before the second step and/or before the first step, and/or the sample is not heated by means of the at least one heating element during the second step.

18. The method according to claim 17, wherein the sample is arranged in an encapsulation at least while the second step is being carried out.

* * * * *